United States Patent
Falkowski et al.

(10) Patent No.: US 8,322,327 B2
(45) Date of Patent: Dec. 4, 2012

(54) GENSET ENGINE USING AN ELECTRONIC FUEL INJECTION SYSTEM INTEGRATING AN ALCOHOL SENSOR

(75) Inventors: David T. Falkowski, Blaine, MN (US); Nick V. Halstead, Cedar, MN (US); Deborah A. Klinkert, Plymouth, MN (US); Matthew J. Ethen, New Brighton, MN (US); Luke R. Staples, St. Louis Park, MN (US)

(73) Assignee: Cummins Power Generation, Inc., Minneapolis, MN (US)

( * ) Notice: Subject to any disclaimer, the term of this patent is extended or adjusted under 35 U.S.C. 154(b) by 329 days.

(21) Appl. No.: 12/695,406

(22) Filed: Jan. 28, 2010

(65) Prior Publication Data

US 2011/0180041 A1 Jul. 28, 2011

(51) Int. Cl.
*F02B 13/00* (2006.01)
*F02B 13/10* (2006.01)

(52) U.S. Cl. .............. 123/575; 123/304

(58) Field of Classification Search .............. 123/575, 123/576, 577, 578, 299, 304, 478, 704; 701/101–105
See application file for complete search history.

(56) References Cited

U.S. PATENT DOCUMENTS

| 4,993,391 | A | * | 2/1991 | Kuribara et al. | 123/482 |
| 5,056,490 | A | * | 10/1991 | Kashima | 123/478 |
| 5,131,228 | A | * | 7/1992 | Mochizuki et al. | 60/602 |
| 5,456,234 | A | * | 10/1995 | Kodama et al. | 123/497 |
| 2009/0210138 | A1 | * | 8/2009 | Hokuto et al. | 701/103 |
| 2009/0283078 | A1 | * | 11/2009 | Okubo | 123/575 |
| 2010/0012081 | A1 | * | 1/2010 | Ashizawa | 123/301 |

* cited by examiner

*Primary Examiner* — Mahmoud Gimie
(74) *Attorney, Agent, or Firm* — Hamre, Schumann, Mueller & Larson, P.C.

(57) ABSTRACT

An open or closed loop EFI system integrating an alcohol sensor is provided on a genset engine. The EFI system provides acceptable engine performance and efficiency when using fuels or fuel blends over a wide band and when starting from a cold state, i.e., starting the engine after the engine has not run for a relatively long period of time. The alcohol sensor enables acceptable operation while the genset engine is cold. The alcohol sensor sends data to the electronic control unit (ECU) and this data, as well as data provided by other sensors that may be available such as an air flow sensor, is used to determine the optimal air-to-fuel ratio (AFR). The ECU actuates the fuel injector which sends the correct amount of atomized fuel to mix with the air flow to be combusted. The fuel mixture, at the requested AFR, enables the engine to start and operate efficiently from a cold state even if the fuel blend has been changed from a previous operation of the engine.

17 Claims, 4 Drawing Sheets

_US 8,322,327 B2_

GENSET ENGINE USING AN ELECTRONIC FUEL INJECTION SYSTEM INTEGRATING AN ALCOHOL SENSOR

FIELD

This disclosure relates to using open loop and, alternately, closed loop electronic fuel injection (EFI) systems containing alcohol sensors on internal combustion engines, particularly a genset engine. Engine sensors send signals to an electronic control unit (ECU) which in turn controls the fuel/air mixture to reach the operative air-to-fuel ratio (AFR) resulting in improved and efficient engine performance. The alcohol sensor sends signals regarding the type of fuel that is being used to further control the AFR allowing for different fuel blends to be used within the same genset engine while maintaining optimal engine performance and efficiency.

BACKGROUND

Fuel injection systems mix fuel with air in internal combustion engines. Fuel is forcibly pumped through a fuel injector resulting in atomization of the fuel which is then mixed with air and is either indirectly or directly placed in the combustion chamber. The fuel/air ratio must be precisely controlled to achieve desired engine performance, emissions, and fuel economy. Fuel injection systems react to changing inputs, where the inputs are data provided by various sensors, by controlling the amount of fuel injected.

Figure 1:
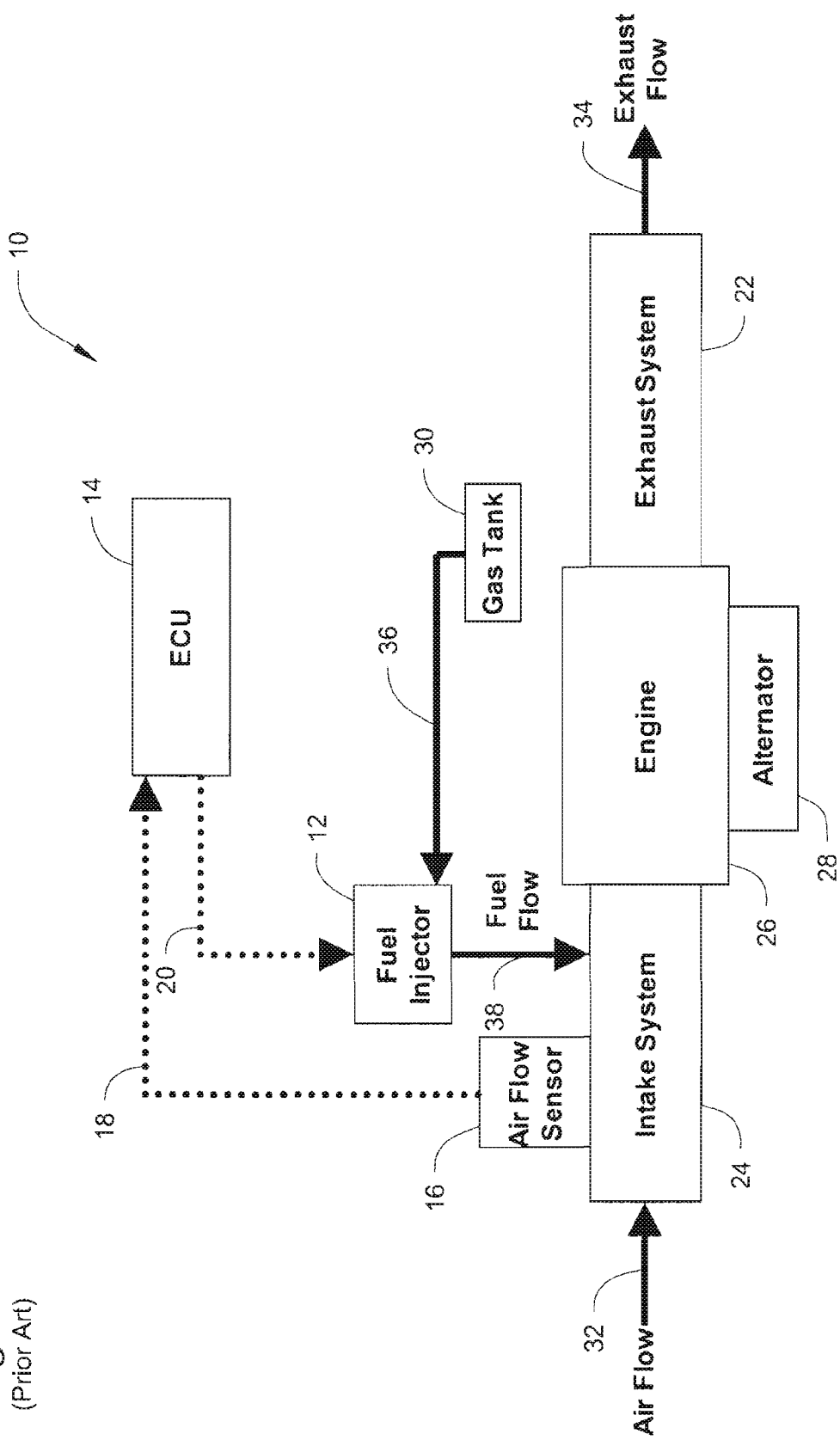

An example of a known open loop electronic fuel injection (EFI) system is illustrated in FIG. 1. The open loop EFI system 10 is comprised of a fuel injector 12, an electronic control unit (ECU) 14, an air flow sensor 16, communication circuitry 18 linking the ECU 14 and the air flow sensor 16 and communication circuitry 20 linking the ECU 14 and the fuel injector 12. Other known components that are sometimes used in such systems, but are not shown in FIG. 1, include a fuel pump, a fuel pressure regulator, other input sensors, which may include but are not limited to, a hall effect sensor, a manifold absolute pressure (MAP) sensor, a throttle position sensor, a coolant temperature sensor, an oil temperature sensor, and a manifold air temperature (MAT) sensor.

Figure 2:
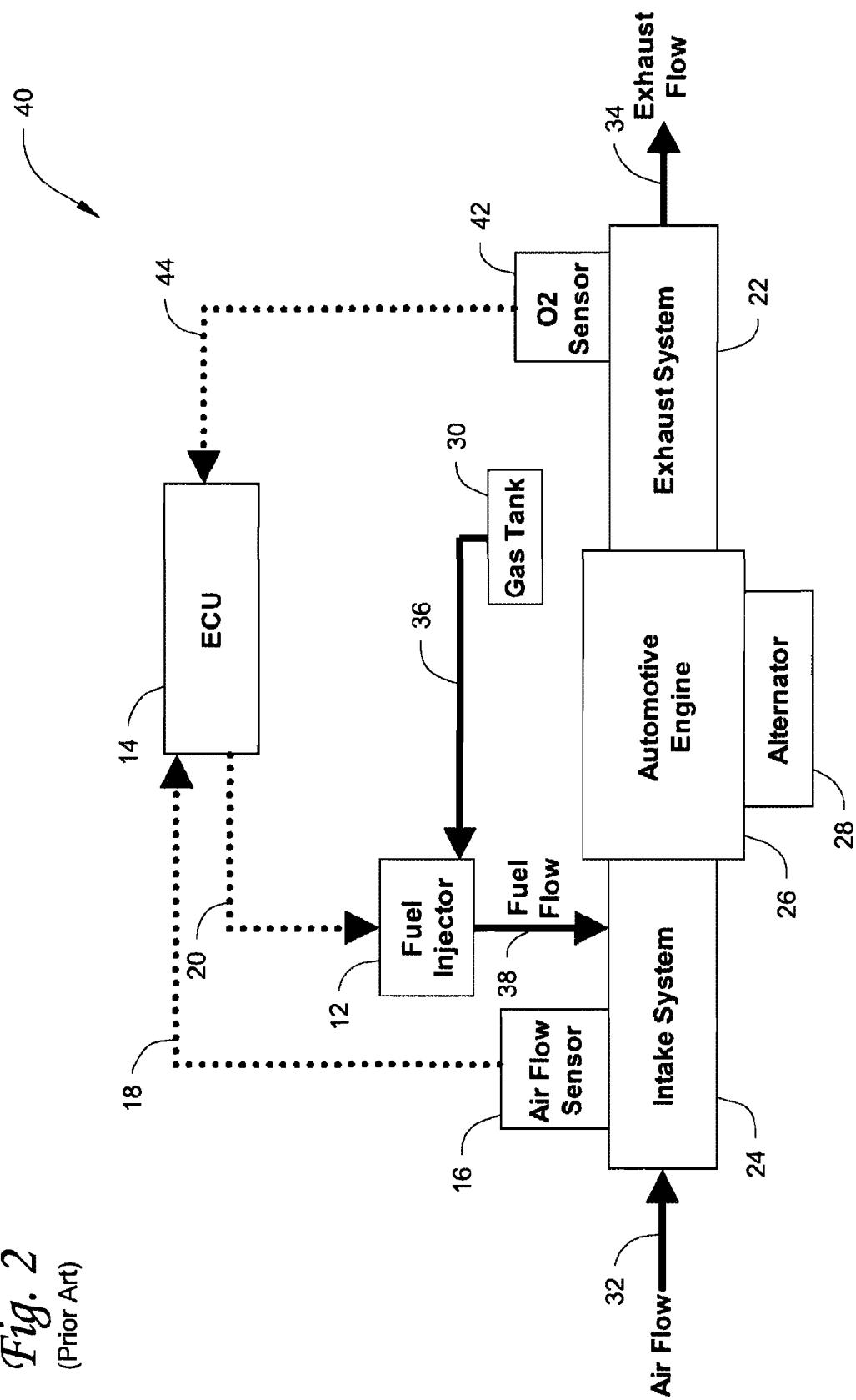

A known closed loop EFI system is illustrated in FIG. 2. The components of the closed loop EFI system 40 are generally the same as that of the open loop EFI system 10 except for the addition of an oxygen sensor 42 located in the exhaust system 22. Communication circuitry 44 links the ECU 14 and the oxygen sensor 42.

Other common features of the engine systems shown in FIGS. 1 and 2 include an exhaust system 22, an intake system 24, the engine 26, an alternator 28, and a gas tank 30. Air flow 32 enters at the intake system 24 and exhaust flow 34 exits at the exhaust system 22. Fuel 36 moves from the gas tank 30 to the fuel injector and is atomized. The atomized fuel 38 enters the intake system.

In an open loop EFI system 10 (e.g., FIG. 1), an air flow sensor 16 (or other sensor(s) such as a MAP or MAT) senses the mass of air that flows past it and transmits this data to the ECU 14. The ECU 14 uses this data, along with the requested relative AFR to provide the correct fuel flow that will provide acceptable engine performance. The requested relative AFR is typically determined from a lookup table using various sensor input data, for example, sensor input data from an oil temperature sensor, from an engine speed sensor, or from other available sensors. The ECU 14 electrically actuates the fuel injector 12 so that the atomized fuel 38 mixes with the air flow 32 to reach the requested relative AFR as provided in the look-up table. Open loop EFI systems 10 do not receive any feedback as to whether the correct AFR is being achieved. The AFR may be incorrect due to degradation of the fuel injector 12, the air flow sensors 16 may be out of tolerance, etc. While an open loop EFI 10 is a lower cost system, the engine may not meet performance and emission requirements since there is not sufficient air/fuel mixture control to enable effective exhaust catalysis, resulting in unacceptable system performance. In general, engines that operate with strictly open loop EFI systems 10 are not used in automobiles, do not operate on fuel blends and are made to operate using only one grade, type or blend of fuel.

A closed loop EFI system 40 (e.g., FIG. 2), works in much the same way as the open loop EFI system 10 except for the addition of the oxygen sensor 42. The oxygen sensor 42 senses the amount of oxygen in the exhaust gas after combustion which is an indicator of whether the AFR is too lean or too rich for optimum combustion. Data regarding the oxygen levels is transmitted to the ECU 14, along with information from other sensors that may be available. The data is processed to determine the AFR so that the ECU 14 can thereby actuate the fuel injector 12 to adjust the amount of atomized fuel 38 injected, so that the air/fuel mixture matches the requested AFR.

During full throttle conditions, on initial start-up, or during a transient occurrence (such as a load suddenly applied to the engine) the ECU 14 may ignore inputs from the oxygen sensor 42, thereby mimicking an open loop state, so that the engine 26 can meet the required performance by running a richer mixture. In the case of initial startup, inputs from the oxygen sensor 42 may be ignored during the start-up phase until appropriate operating temperatures are reached, wherein the time from start-up to oxygen sensor 42 input reading can be delayed from several seconds to a couple of minutes, resulting in non-optimal engine performance. Closed loop EFI systems are known in the automotive industry.

In addition, some closed loop EFI systems 40 in the automotive industry incorporate alcohol sensors. This allows automobiles to operate on various blends of gasoline and ethanol, and also operate in the event the alcohol content is varied, for example, if ethanol is put into a tank that still contains gasoline. In general, fuel is added to the tank after the automobile is driven to a fueling station. In such a case, the oxygen sensors and alcohol sensors are typically operating in a hot or warm re-starting state, rather than a cold re-starting state of the engine, and adjustments to the AFR are done fairly quickly with a minimum of performance and efficiency issues. Engines that operate on fuels that have a wide range of ethanol and gasoline blends use closed loop control, with or without alcohol sensors, to provide the correct fueling so that the AFR is attained for acceptable performance.

However, it is not known in the automotive industry or in other engine applications to incorporate alcohol sensors into an open loop EFI system where different grades or types of fuels may be blended and used. There is a need for an open loop EFI system that incorporates alcohol sensors for other engine types, i.e., genset engines.

SUMMARY

An open loop EFI system with an alcohol sensor, or alternately a closed loop EFI system with an alcohol sensor, is described. The EFI system is useful for a genset engine, but may be used in any type of internal combustion engine where appropriate. The integration of an alcohol sensor in an open loop control provides acceptable engine performance and efficiency when using fuels or fuel blends over a wide band and when starting from a cold state, i.e., starting the engine after being shut off for a relatively long period of time. The alcohol sensor enables the engine to achieve acceptable performance, over a range of alcohol/gasoline blends, while the engine is running but where the fuel composition may be changing.

The alcohol sensor sends data to the electronic control unit (ECU) and this data, as well as data that may be provided by other sensors, for example, oil temperature sensor, coolant temperature sensor, MAP sensor, MAT sensor, and engine speed sensor, is used to determine the optimal air-to-fuel ratio (AFR). The ECU actuates the fuel injector and the fuel injector sends the requested amount of fuel to mix with the air flow to be combusted. This provides the engine with a fuel mixture that is at the requested AFR and the engine is able to start and operate efficiently from a cold state even if the fuel type or grade has been changed from a previous operation of the engine.

Genset engines are generally known as stand-alone engines that generate power to run electrical devices. A genset engine may be a back-up power source in the event of a loss of electrical grid power. In one embodiment, genset engines are provided in recreational vehicles to subsidize grid electricity or as the primary power source when grid electricity is not being used. In other embodiments, the genset engine may be provided as a secondary source of power for a home or business. In yet another embodiment, the genset engine may be the primary source of power where grid power is not readily available, such as remote locations or construction sites. It is to be realized that genset engines have many uses and are not limited to the uses in the above stated embodiments.

When the genset engine is used in a recreational vehicle, it is preferred that the fuel provided to the genset engine be the same fuel that is currently being used in the recreational vehicle. However, it is not uncommon for the genset engine to be shut off for relatively long periods of time and to start from a cold state, such that the fuel blend currently in the recreational vehicle, or that is later added to the recreational vehicle, or that is added to the fuel tank of the genset engine in a non-recreational vehicle use, may be different than the fuel that was last supplied to the genset when it was last operated. That is the fuel blend may change for various reasons, depending on what fuel is being used. In such cases, it is desired to have the genset engine to be able to quickly identify the fuel blend and adjust quickly, at the time of a cold start, to provide fast starting and acceptable engine performance.

The problem is that a genset engine can be provided with a relatively wide range of gasoline and alcohol blends, and due to the engines' narrow AFR band of operation needed for acceptable performance, a wide band of fuel blends can result in poor starting and running performance. In order to operate the genset with acceptable performance, fuel must be provided at a cold start state and at normal operation, such that the AFR of fresh charge for combustion remains within a relatively narrow band. Known gensets are calibrated to run on only a single alcohol/gasoline blend of fuel, so the genset engine starts and operates well when running on that specific blend of alcohol/gasoline, but its starting and operating performance will deteriorate when operating on other alcohol/gasoline blends. As the percentage of alcohol in the blend of fuel changes, known gensets are not able to account for the change in oxygen in the fresh charge of fuel and air, and therefore cannot deliver the correct amount of fuel to reach the AFR needed to start and operate the genset with acceptable performance.

The actual value of the AFR needed to run the genset engine is a function of the fuel. An engine running on gasoline may require an AFR slightly rich of stoichiometric (about 14.6), while an engine running on 100% ethanol may also require an AFR slightly rich of stoichiometric (about 9.0). Since these stoichiometric values are considerably different, the term relative AFR is used to describe the ratio of the actual AFR to the stoichiometric AFR. It is difficult to put a range on requested AFR, as it is a function of several variables including engine design, performance requirements, etc. An approximate range for relative AFR for gensets is 0.8 to 1.0. The situation becomes even more complex when discussing AFR's required for starting, as the fuel's evaporation characteristics strongly influences the AFR.

One solution herein is to provide an open loop EFI system integrating an alcohol sensor on a genset engine. This will allow the genset to start and operate within acceptable performance ranges on multiple and changing ethanol/gasoline blends.

In one embodiment, a genset engine is described that integrates an open loop EFI system with an alcohol sensor. By using an alcohol sensor with open loop control, the genset is able to attain acceptable performance without the cost and complexity of a closed loop system that uses extra parts such as exhaust sensors or complex algorithms. In addition, this system is able to run efficiently from a cold start.

In another embodiment, a genset engine is described that integrates a closed loop EFI system with an alcohol sensor. The closed loop EFI system is similar to the open loop system, except that the closed loop EFI system also uses an oxygen sensor that inputs data regarding the exhaust gases to the ECU during runtime, for example after the components have reached a specific temperature. Therefore, from a cold start-up, the closed loop EFI system can mimic the operation of an open loop EFI system resulting in quick starting and efficient operation of the genset engine.

DRAWINGS

Figure 3:
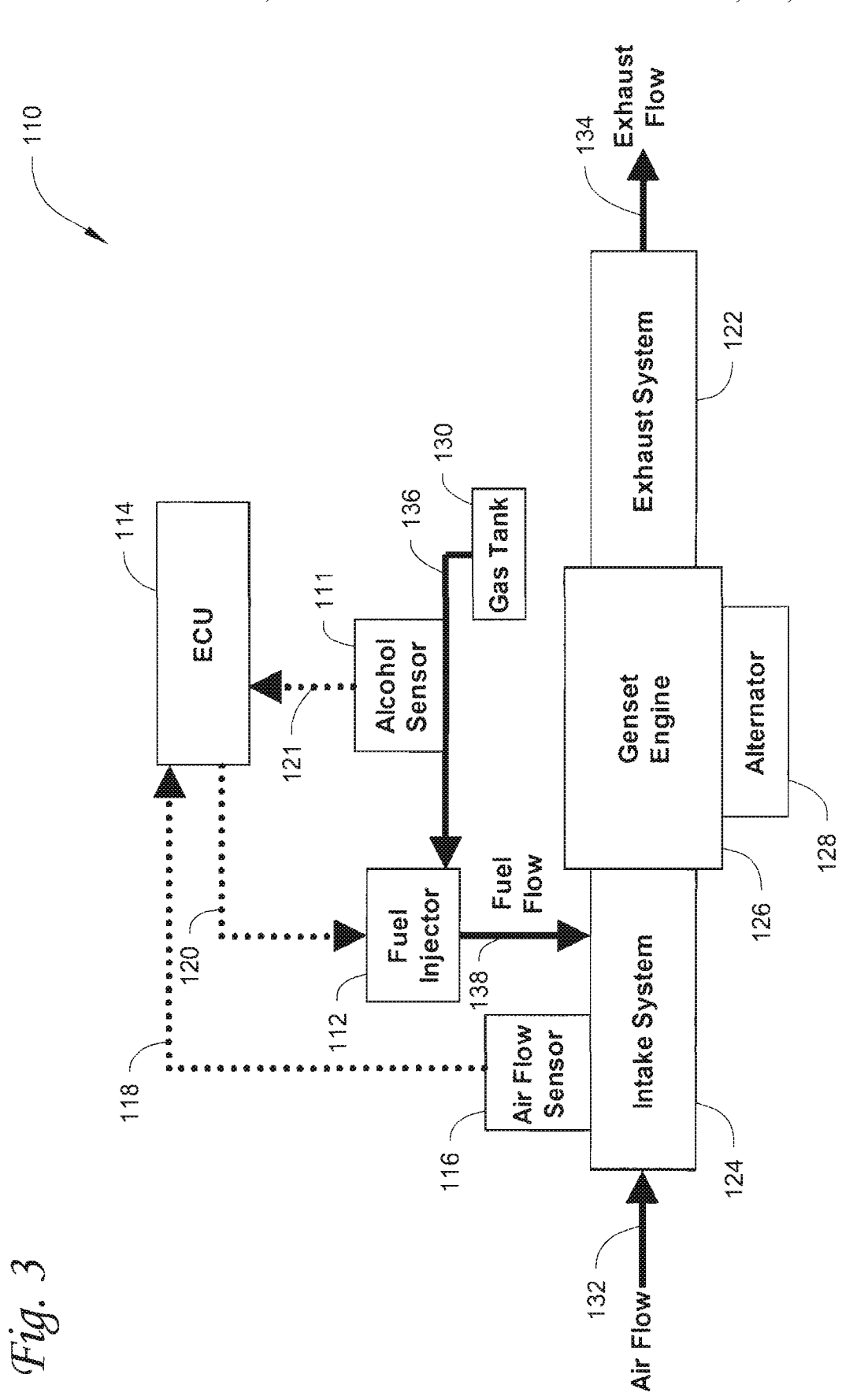
Figure 4:
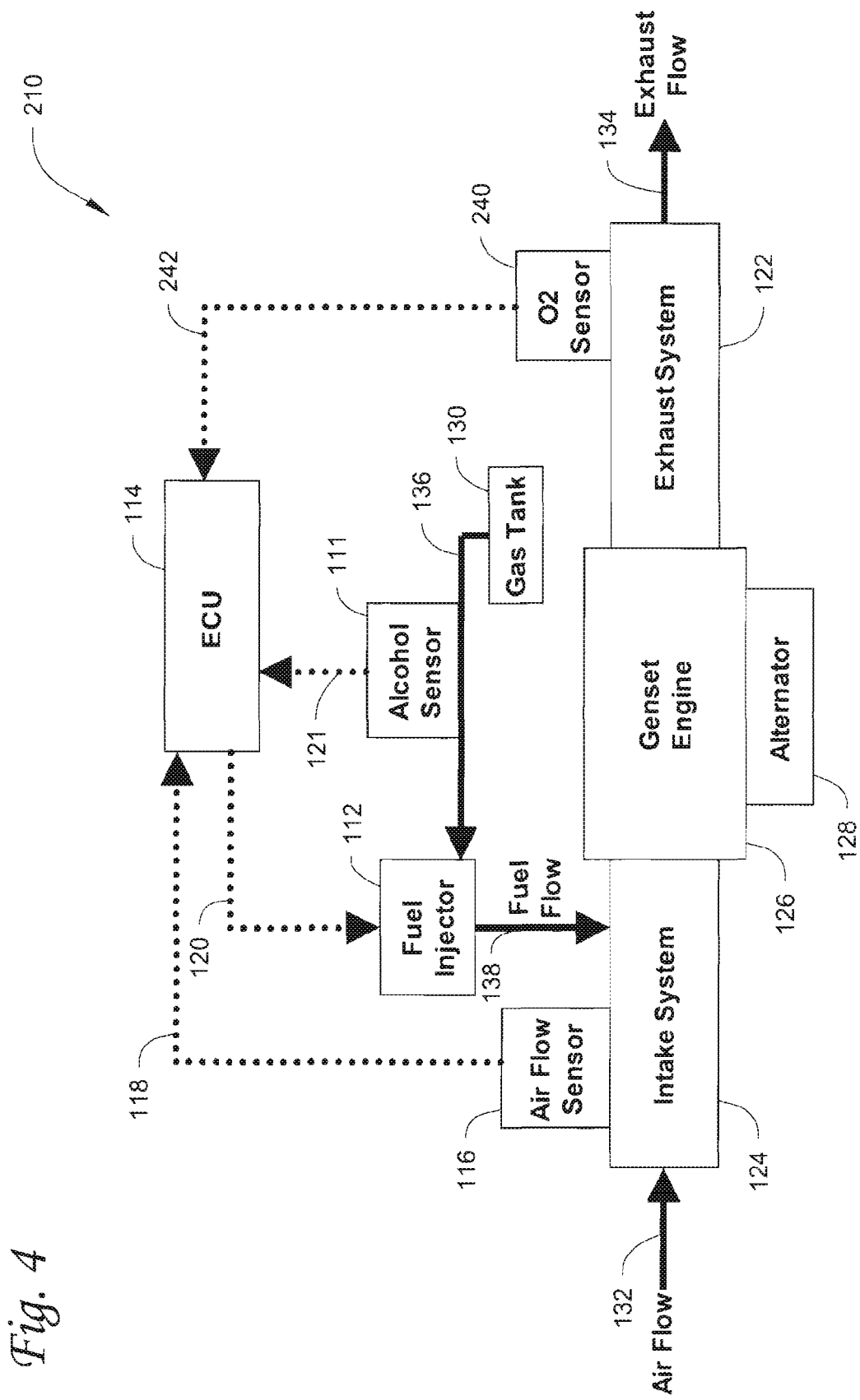

FIG. 1 illustrates a conventional open loop EFI system.
FIG. 2 illustrates a conventional closed loop EFI system.
FIG. 3 illustrates a schematic of an open loop EFI system with an alcohol sensor.
FIG. 4 illustrates a schematic of a closed loop EFI system with an alcohol sensor.

DETAILED DESCRIPTION

An electronic fuel injection (EFI) system integrated with an alcohol sensor is described on a genset engine. It is to be realized that even though a genset engine is discussed herein, the engine can be any internal combustion engine. A genset engine is described that uses an open loop EFI system with an alcohol sensor, or alternately a closed loop EFI system with an alcohol sensor. The integration of an alcohol sensor can provide optimal engine performance when using fuels or fuel blends over a wide band and when starting from a cold state, i.e., starting the engine after being turned off for a relatively long period of time. Use of an alcohol sensor also enables acceptable operation while the genset engine is running even though the fuel composition is changing.

The alcohol sensor sends data to the electronic control unit (ECU) and this data, as well as data that may be available from other sensors, is used to determine the optimal air-to-fuel ratio (AFR). The ECU actuates the fuel injector and the fuel injector sends the correct amount of atomized fuel to mix with the air flow to be combusted. This provides the genset engine with a fuel mixture that is at the requested AFR and the genset engine is able to start and operate efficiently from a cold state even if the fuel type or grade has been changed from a previous operation of the genset engine.

An embodiment of an open loop EFI system 110 integrated with a genset engine is shown in FIG. 3. The open loop EFI system 110 is comprised of a fuel injector 112, an electronic control unit (ECU) 114, an air flow sensor 116, an alcohol sensor 111, communication circuitry 118 linking the ECU 114 and the air flow sensor 116, communication circuitry 120 linking the ECU 114 and the fuel injector 112, and communication circuitry 121 linking the ECU 114 and the alcohol sensor 111.

Other known components sometimes used in such systems, but not shown in FIG. 3, include for example a fuel pump, a fuel pressure regulator, and other input sensors. Such sensors may include but are not limited to for example, a hall effect sensor, a manifold absolute pressure (MAP) sensor, a throttle position sensor, a coolant temperature sensor, an oil temperature sensor, engine speed sensor, and a manifold air temperature (MAT) sensor. FIG. 3 also shows features of the genset engine system that include an intake system 124, the engine 126, an alternator 128, an exhaust system 122, and a gas tank 130. Air flow 132 enters at the intake system 124 and exhaust flow 134 exits at the exhaust system 122. Fuel 136 moves from the gas tank 130 to the fuel injector 112 and is atomized. The atomized fuel 138 enters the intake system 124.

The ECU 114 is the system computer and monitors engine operating parameters via various input sensors that are employed. The ECU 114 contains look-up tables or algorithms used to determine the requested relative air-to-fuel ratio (AFR). The stoichiometric AFR is a function of fuel composition and is the mass ratio of air to fuel in which there is not excess air or excess fuel after combustion. The ECU 114 uses the data from the sensors to determine the requested relative AFR which is the ratio of the actual AFR to the stoichiometric AFR and sends a signal to the fuel injector 112 to open it at a specific time and for a specific length of time to achieve the requested relative AFR. To have the genset engine 126 start and operate at the requested relative AFR ratio in the calibration, the ECU 114 determines the amount of fuel that is needed and the ECU 114 actuates the fuel injector 112 to release fuel so that the fuel can mix with the air flow to reach the requested relative AFR.

In one embodiment, the fuel injector 112 is an electromechanical valve that provides metering of the fuel into the genset engine 126. The fuel injector 112 is normally closed, and opens to inject pressurized fuel for a specified length of time. The fuel injector 112 atomizes the fuel by forcibly pumping the fuel through a small nozzle under high pressure and, in one embodiment, the atomized fuel 138 is mixed with the air flow 132 in the intake system 124 of the genset engine 126. In another embodiment, the atomized fuel 138 and air flow 132 are mixed in the combustion area of the genset engine 126. The ECU 114 sends signals to the fuel injector 112 via communication circuitry 120.

The alcohol sensor 111 senses the amount of alcohol in the fuel 136 that is to be supplied to the fuel injector 112 and this information is transmitted to the ECU 114 via communication circuitry 121. The alcohol sensor 111 may also provide information on fuel density, viscosity and the dielectric constant, which helps to determine the correct amount of requested fuel even more accurately. For example, the fuel 136 may range from gasoline (0% ethanol) to 100% ethanol. The alcohol sensor 111 can be disposed in or on the gas tank 130 or the fuel lines or other part that has fuel.

The air flow sensor 116 measures the air intake of the genset engine 126. Air flow is determined by either the mass airflow or the speed density. The airflow measurement is sent as data to the ECU 114 via communication circuitry 118. In one embodiment, the air flow sensor 116 is disposed on the intake system 124 of the genset engine 126. In other embodiments, a manifold absolute pressure (MAP) sensor and/or a manifold air temperature (MAT) sensor, or any combination of an air flow sensor, MAP sensor, and MAT sensor, can be used to determine mass airflow and/or speed density.

In the embodiment shown in FIG. 3, as the genset engine 126 is being started, for example from a cold state, the air flow sensor 116 senses the mass of air that flows past the air flow sensor 116 and transmits this data to the ECU 114. The alcohol sensor 111 senses the level of alcohol in the fuel and transmits this data to the ECU 114. Other sensors that may be available also send information to the ECU 114. The ECU 114 uses the data supplied from the alcohol sensor 111 and also from the air flow sensor 116, as well as any other data from other available sensors, to determine the requested relative AFR ratio (i.e., ratio of the actual AFR to the stoichiometric AFR). The requested relative AFR is a value set in the look-up table that will provide acceptable genset engine 126 performance based on the given parameters.

To have the genset engine 126 start and operate at the requested relative AFR ratio in the calibration, the ECU 114 uses the air flow 132 information, the fuel 136 composition information (e.g. alcohol content), and the requested relative AFR ratio to determine the amount of fuel 136 that is needed at a cold start and normal operating conditions. The ECU 114 electrically actuates the fuel injector 112 to inject fuel 138 to be mixed with the air flow 132 in a ratio to thereby reach the relative AFR.

It is preferable that upon starting, accurate readings are obtained in less than a second and in no more than two seconds because the quicker the data is provided to the ECU 114, the more accurate the fuel that is delivered and the sooner that acceptable performance is achieved. In another embodiment, accurate readings are obtained at least within a few seconds. Once the genset engine 126 is running, the sensors 111, 116 continuously monitor and send data to the ECU 114 so that real-time adjustments are made to the AFR and the genset engine 126 runs at its optimal performance. Real-time adjustments are adjustments that are done almost instantly upon receiving input data. For example, a real-time adjustment would occur if the ECU 114 sensed a load change during an engine cycle and then changed the fuel delivered to the engine in the very next cycle. An adjustment that takes several seconds, and several cycles, would not be adjusted in real-time. An example of this would be if a Fast Fourier Transform, which is a complicated algorithm, were being used in the ECU 114 on the input from a knock sensor to determine if the genset was running properly. This calculation takes several seconds, which is a relatively large amount of time compared to an engine cycle, and the calculation must complete before the ECU 114 can take action. Thus, the adjustment would not be in real-time. In another embodiment, the genset engine 126 can be hot re-started without any degradation in performance. In another embodiment, the genset engine 126 can have an additional load placed on it and the open loop EFI system 110 will adjust without any loss of performance.

An embodiment of a closed loop EFI system 210 integrated with a genset engine is shown in FIG. 4. The closed loop EFI system 210 is comprised of an oxygen sensor 240, a fuel injector 112, an electronic control unit (ECU) 114, an air flow sensor 116, an alcohol sensor 111, communication circuitry 242 linking the ECU 114 and the oxygen sensor 240, communication circuitry 118 linking the ECU 114 and the air flow sensor 116, communication circuitry 120 linking the ECU 114 and the fuel injector 112, and communication circuitry 121 linking the ECU 114 and the alcohol sensor 111.

Other known components sometimes used in such systems, but not shown in FIG. 3, include a fuel pump, a fuel pressure regulator, other various input sensors, which may include, a hall effect sensor, a manifold absolute pressure (MAP) sensor, a throttle position sensor, a coolant temperature sensor, an oil temperature sensor, an engine speed sensor, and a manifold air temperature (MAT) sensor. FIG. 4 also shows features of the genset engine system that include an intake system 124, the engine 126, an alternator 128, an exhaust system 122, and a gas tank 130. Air flow 132 enters at the intake system 124 and exhaust flow 134 exits at the exhaust system 122. Fuel 136 moves from the gas tank 130 to the fuel injector 112 and is atomized. The atomized fuel 138 enters the intake system 124.

The ECU 114 is the system computer and monitors engine operating parameters via various input sensors that are employed. The ECU 114 contains look-up tables or algorithms used to determine the requested relative air-to-fuel ratio (AFR). The stoichiometric AFR is a function of fuel composition and is the mass ratio of air to fuel in which there is not excess air or excess fuel after combustion. The ECU 114 uses the data from the sensors to determine the requested relative AFR, which is the ratio of the actual AFR to the stoichiometric AFR, and sends a signal to the fuel injector 112 to open it at a specific time and for a specific length of time to achieve the requested relative AFR. To have the genset engine 126 start and operate at the requested relative AFR ratio in the calibration, the ECU 114 determines the amount of fuel that is needed, at a cold start and during combustion or ongoing operation, and the ECU 114 actuates the fuel injector 112 to release fuel so that the fuel can mix with the air flow to reach the requested relative AFR.

The oxygen sensor 240 monitors the oxygen content of the exhaust flow 134 in the exhaust system 122. The oxygen sensor 240 reads the oxygen content of the exhaust gases after combustion and transmits this data to the ECU 114 via communication circuitry 242. The ECU 114 then determines if the amount of fuel provided is too rich or too lean for optimum combustion and adjusts the relative AFR accordingly. On starting, during transients, and under full throttle conditions, i.e. when there is maximum load on the genset engine 126, the inputs from the oxygen sensor 240 to the ECU 114 may be ignored by the ECU 114, resulting in the closed loop system mimicking an open loop system with an alcohol sensor 111, so that the engine 126 can reach acceptable performance by running a richer mixture. At a cold start-up, the oxygen sensor 240 inputs may be ignored by the ECU 114, for up to three minutes or longer until the oxygen sensor 240 reaches the operating temperature it needs to provide an accurate reading.

The fuel injector 112 is an electro-mechanical valve that provides metering of the fuel into the genset engine 126. The fuel injector 112 is normally closed, and opens to inject pressurized fuel for a specified length of time. The fuel injector 112 atomizes the fuel by forcibly pumping the fuel through a small nozzle under high pressure and, in one embodiment, the atomized fuel 138 is mixed with the air flow 132 in the intake system 124 of the genset engine 126. In another embodiment, the atomized fuel 138 and air flow 132 are mixed in the combustion area of the genset engine 126. The ECU 114 sends signals to the fuel injector 112 via communication circuitry 120.

The alcohol sensor 111 senses the relative amount of alcohol in the fuel 136 that is to be supplied to the fuel injector 112 and this information is transmitted to the ECU 114 via communication circuitry 121. The alcohol sensor 111 may also provide information on fuel density, viscosity and the dielectric constant, which helps to determine the correct amount of requested fuel even more accurately. For example, the fuel 136 may range from gasoline (0% ethanol) to 100% ethanol. The alcohol sensor 111 can be disposed, for example, in or on the gas tank 130 or the fuel lines or other part that has fuel.

The air flow sensor 116 measures the air intake of the genset engine 126. Air flow is determined by either the mass airflow or the speed density. The airflow measurement is sent as data to the ECU 114 via communication circuitry 118. In the embodiment shown, the air flow sensor 116 is disposed on the intake system 124 of the genset engine 126.

In the embodiment of a closed loop EFI system, as shown in FIG. 4, as the genset engine 126 is being started for example from a cold state, the air flow sensor 116 senses the mass of air 132 that flows past it and transmits this data to the ECU 114 and the alcohol sensor 111 senses the level of alcohol in the fuel and transmits this data to the ECU 114. The oxygen sensor 240 senses the oxygen content of the exhaust flow 134 but this data is ignored by the ECU 114 at cold state startup, effectively causing the closed loop EFI system 210 to run in an open loop configuration with an alcohol sensor 111 until the operating temperature of the oxygen sensor is reached. Other sensors that may be available may also send information to the ECU 114.

That is, at a start-up condition such as a cold startup, the ECU 114 temporarily ignores the data from the oxygen sensor 240 and uses the data supplied from the alcohol sensor 111 and the air flow sensor 116, as well as relevant data from other sensors that may be available, to determine the requested relative AFR ratio (i.e., the ratio of the actual AFR to the stoichiometric AFR). The requested relative AFR is a value set in the look-up table that will provide acceptable genset engine 126 performance based on the given parameters. The ECU 114 electrically actuates the fuel injector 112 so that the atomized fuel 138 mixes with the air flow 132 to reach the relative AFR. To have the genset engine 126 start and operate at the requested relative AFR ratio in the calibration, the ECU 114 uses the air flow 132 information, the fuel 136 composition information, information from other sensors, and the requested relative AFR ratio to determine the amount of fuel 136 that is needed, at a cold start and at combustion. The ECU 114 then actuates the fuel injector 112, such that atomized fuel 138 mixes with the air flow 132 to reach the requested relative AFR. It is preferable that upon starting, accurate readings from the alcohol sensor are obtained in less than a second and in no more than 2 seconds.

Once the genset engine 126 is running, the sensors 111, 116 continuously monitor and send data to the ECU 114, so that real-time adjustments are made to the AFR and the genset engine 126 runs at an acceptable level of performance, even without input from the oxygen sensor 240. Once the genset engine 126 has been running and the oxygen sensor 240 reaches its optimal operating temperature, its data is read by the ECU 114 and this information is read to fine-tune, add, or trim the amount of atomized fuel 138 that is injected, so that the actual AFR matches the requested relative AFR. By providing an alcohol sensor 111 on a closed loop EFI system 210 of a genset engine, the genset engine 126 can be run at optimal performance from a cold start, and is not reliant on the oxygen sensor 240 reaching its operational temperature in order to start with optimal performance.

It is known that gasoline has a stoichiometric AFR of about 14.6, whereas 100% ethanol has a stoichiometric AFR of about 9.0, which results in a wide band of relative AFR's that the genset engine 126 must be able to adapt to in order to run at acceptable performance. The genset engine 126 described herein is capable of operating within performance and emission requirements in this wide band and also with gasoline and alcohol blended fuels, due to its ability to sense the relative level of alcohol per the alcohol sensor 111, transmitting this data to the ECU 114 which subsequently controls the fueling to attain the requested AFR needed for acceptable performance.

As one example, an advantage is that the genset engine 126, open loop or closed loop, will be able to run on ethanol (E-85) fuel as well as other fuels and fuel blends. Another advantage is that the transient response of the genset engine 126 will be improved. The genset will have improved response to transient load steps, due to the comparison of multiple data inputs to the ECU 114.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A genset system comprising:
an engine that is capable of running on fuel that includes at least one selected from the group consisting of gasoline and alcohol;
a generator that is driven by the engine;
an intake system that receives air and is in fluid communication with the engine;
a fuel injector that injects the fuel into the intake system so as to form an air/fuel mixture within the intake system,
an electronic control unit,
an air flow sensor that measures an air flow of the intake system,
an alcohol sensor that measures the amount of alcohol in the fuel that is supplied to the fuel injector,
a first communication circuitry linking the electronic control unit and the alcohol sensor,
a second communication circuitry linking the electronic control unit and the fuel injector, and
a third communication circuitry linking the electronic control unit and the air flow sensor, and
wherein data from the alcohol sensor and air flow sensor are transmitted to the electronic control unit via the first and third communication circuitry,
wherein the electronic control unit is configured to determine a requested relative air to fuel ratio based on the data from the alcohol sensor and the data from the air flow sensor, the requested relative air to fuel ratio being a ratio of the actual air to fuel ratio to a stoichiometric air to fuel ratio, and based on the determined requested relative air to fuel ratio, the electronic control unit is configured to actuate the fuel injector via the second communication circuitry such that the fuel in an amount sufficient for obtaining an air/fuel mixture that is at the determined requested relative air to fuel ratio is injected into the intake system,
wherein the engine provided with the air/fuel mixture that is at the determined requested relative air to fuel ratio is capable of starting and operating from a cold state.

2. The system of claim 1, wherein the alcohol sensor is disposed in or on a fuel tank from which fuel is supplied to the fuel injector.

3. The system of claim 1, wherein the alcohol sensor is disposed on a fuel line that connects the fuel injector and a fuel tank.

4. The system of claim 1, wherein the alcohol sensor is disposed in or on a part that contains fuel.

5. The system of claim 1, wherein the fuel is alcohol.

6. The system of claim 1, wherein the genset engine is provided in a recreational vehicle.

7. The system of claim 6, wherein the genset engine and the recreational vehicle are provided with a same fuel source.

8. The system of claim 1, wherein the genset engine is a stand-alone engine.

9. The system of claim 1, further comprising an oxygen sensor,
a fourth communication circuitry linking the electronic control unit and the oxygen sensor, and
wherein data from the oxygen sensor is transmitted to the electronic control unit via the fourth communication circuitry.

10. The system of claim 9, wherein the electronic control unit is configured to temporarily ignore data from the oxygen sensor until the oxygen sensor reaches an operative temperature.

11. The system of claim 9, wherein the data from the oxygen sensor is ignored by the electronic control unit when full throttle conditions exist.

12. The system of claim 1, wherein the fuel that is injected into the intake system is atomized.

13. A method of controlling air-to-fuel ratio in a genset engine comprising:
integrating an electronic fuel injection system with a genset assembly that includes an engine that is capable of running on fuel that includes at least one selected from the group consisting of gasoline and alcohol, a generator that is driven by the engine and an intake system that receives air and is in fluid communication with the engine, the electronic fuel injection system including an alcohol sensor that measures the amount of alcohol in the fuel that is supplied to the fuel injector from a fuel tank, a fuel injector that injects the fuel into the intake system so as to form an air/fuel mixture within the intake system, an electronic control unit, and an air flow sensor that measures an air flow of the intake system, such that the electronic control unit and the alcohol sensor are linked with a first communication circuitry, the electronic control unit and the fuel injector are linked with a second communication circuitry, and the electronic control unit and the air flow sensor are linked with a third communication circuitry,
transmitting data from the alcohol sensor and data from the air flow sensor to the electronic control unit via the first and third communication circuitry,
determining a requested relative air to fuel ratio based on the transmitted data from the alcohol sensor and the air flow sensor, the requested relative air to fuel ratio being a ratio of the actual air to fuel ratio to a stoichiometric air to fuel ratio; and
actuating the fuel injector based on the determined requested relative air to fuel ratio via the second communication circuitry such that the fuel in an amount sufficient for obtaining an air/fuel mixture that is at the determined requested relative air to fuel ratio is injected into the intake system, wherein the engine provided with the air/fuel mixture that is at the determined requested relative air to fuel ratio is capable of starting and operating from a cold state.

14. The method of claim 13, further comprising transmitting data from an oxygen sensor to the electronic control unit via a fourth communication circuitry.

15. The method of claim 14, further comprising ignoring the data from the oxygen sensor until the oxygen sensor reaches an operative temperature.

16. The method of claim 14, further comprising ignoring the data from the oxygen sensor when a full throttle condition exists.

17. The method of claim 13, wherein the fuel that is injected into the intake system is atomized.

* * * * *